(12) United States Patent
McClure et al.

(10) Patent No.: US 7,337,245 B2
(45) Date of Patent: Feb. 26, 2008

(54) PROTOCOL ADAPTER FOR PASSING DIAGNOSTIC MESSAGES BETWEEN VEHICLE NETWORKS AND A HOST COMPUTER

(75) Inventors: Robert E. McClure, Danville, IN (US); David M. Such, Greenwood, IN (US)

(73) Assignee: Dearborn Group, Inc., Farmington Hills, MI (US)

( * ) Notice: Subject to any disclaimer, the term of this patent is extended or adjusted under 35 U.S.C. 154(b) by 453 days.

(21) Appl. No.: 10/888,432

(22) Filed: Jul. 9, 2004

(65) Prior Publication Data

US 2005/0038921 A1 Feb. 17, 2005

Related U.S. Application Data

(63) Continuation-in-part of application No. 09/532,718, filed on Mar. 22, 2000, now Pat. No. 6,772,248.

(60) Provisional application No. 60/126,588, filed on Mar. 26, 1999.

(51) Int. Cl.
*G06F 3/00* (2006.01)
(52) U.S. Cl. .......................................... 710/36; 710/31

(58) Field of Classification Search .................. 701/32, 701/33, 36, 35, 53, 31; 108/6.28, 6, 28; 340/853.2
See application file for complete search history.

(56) References Cited

U.S. PATENT DOCUMENTS

| | | | |
|---|---|---|---|
| 5,491,418 A * | 2/1996 | Alfaro et al. ................ | 324/402 |
| 5,541,840 A | 7/1996 | Gurne et al. | |
| 5,646,865 A * | 7/1997 | Alfaro et al. .................. | 701/29 |
| 5,870,573 A | 2/1999 | Johnson | |
| 5,896,569 A | 4/1999 | Butler et al. | |
| 5,964,852 A * | 10/1999 | Overton ....................... | 710/62 |
| 6,122,684 A | 9/2000 | Sakura | |
| 6,195,359 B1 | 2/2001 | Eng et al. | |
| 6,571,136 B1 * | 5/2003 | Staiger ........................ | 700/48 |

* cited by examiner

*Primary Examiner*—Donald Sparks
*Assistant Examiner*—Harold Kim
(74) *Attorney, Agent, or Firm*—Warn Partners, P.C.

(57) ABSTRACT

A protocol adapter for transferring diagnostic messages between networks within a vehicle and a host computer. The protocol adapter operates as a voltage translator to support J1708 software. The protocol adapter also recognizes when the protocol adapter is connected to a host computer running the J1939 and/or J1708 protocols and automatically switches to that protocol.

8 Claims, 9 Drawing Sheets

PROTOCOL ADAPTER FOR PASSING DIAGNOSTIC MESSAGES BETWEEN VEHICLE NETWORKS AND A HOST COMPUTER

CROSS-REFERENCE TO RELATED APPLICATIONS

This application is a Continuation-in-Part Application of U.S. application Ser. No. 09/532,718, titled Protocol Adapter for In-Vehicle Networks, filed Mar. 22, 2000 now U.S. Pat. No. 6,772,248, which claims the benefit of the filing date of U.S. Provisional Patent Application Ser. No. 60/126,588, filed Mar. 26, 1999.

BACKGROUND OF THE INVENTION

1. Field of the Invention

This invention relates generally to a protocol adapter for passing diagnostic messages between networks within a vehicle and a host computer and, more particularly, to a protocol adapter for passing diagnostic messages between networks within a vehicle and a host computer, where the protocol adapter includes a pass-through mode of operation where the protocol adapter emulates legacy protocol adapters so that state of the art host computers can communicate with the vehicle networks using obsolete software.

2. Discussion of the Related Art

Vehicles employ various networks and systems for diagnostics, analysis and monitoring of vehicle systems. These various networks are generally selectively connectable to an external host computer so that the operation of the vehicle networks can be monitored by an external system. These vehicle systems and networks operate under various protocols, such as the J1708 and the J1939 protocols. Protocol adapters are known in the art that allow the host computer to communicate with the vehicle networks through the protocols.

One known type of protocol adapter for this purpose is the J1708 protocol adapter. The first generation of the J1708 protocol adapter used for diagnostic purposes included a voltage translator with a built-in-timer circuit that flagged the end of a message. This protocol adapter design worked well for J1708 protocols because it and the standard serial communication port of the host computer were based on universal asynchronous receive and transmit (UART) technology having different physical interfaces, i.e., different voltages. The timer circuit was needed to allow the host computer to recognize the end of message as defined by the J1708 protocol. Most host computers, however, did not have adequate resources to comply with the rigid timing requirements needed for end of message detection.

A second generation protocol for vehicle diagnostics purposes is the J1939 protocol. With the J1939 protocol, there was no longer a basic compatibility between the known host computer serial communication port and the J1939 protocol. It therefore became necessary for protocol adapters to use microprocessors in their diagnostic tools. These microprocessors would receive an entire message from one of the supported links, and do message validation, including end of message detection. The microprocessor would then forward the message on to the appropriate communication channel if it did not detect an error. This alleviated the need for the timer to detect the end of message, but also added an inherent delay between the vehicle data link and the host computer serial communication port.

The J1939 protocol required that software had to be matched to the diagnostic tool for which it was written. Obsolete software had to be paired with legacy hardware, and new software had to be paired with new hardware. This required that each diagnostic shop own and maintain several diagnostic tools. It would be desirable to have a protocol adapter that could operate as an old voltage translator to support obsolete software using the J1708 protocol, and recognize when the protocol adapter is connected to a host computer running new software to automatically switch to the J1939 protocol.

SUMMARY OF THE INVENTION

In accordance with the teachings of the present invention, a protocol adapter is disclosed for transferring diagnostic messages between networks within a vehicle and a host computer. The protocol adapter operates as a voltage translator to support J1708 software. The protocol adapter also recognizes when the protocol adapter is connected to a host computer running the J1939 and/or J1708 protocols and automatically switches to that protocol.

In one embodiment, the protocol adapter includes a control area network (CAN) transceiver circuit that provides an interface between the vehicle network and the host computer when the vehicle network is operating in a J1939 protocol and a J1708 transceiver that provides an interface between the vehicle network and the host computer when the vehicle network is operating in a J1708 protocol. The J1708 transceiver circuit includes a voltage translator for translating the voltage of the J1708 protocol signals. The protocol adapter further includes a static random access memory (RAM) circuit that provides temporary data storage and is connected to the CPU through data and address channels, a flash memory module that provides permanent storage of application data and loader application information, and a universal asynchronous receive and transmit (UART) circuit that provides communication of asynchronous data to and from the host computer.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a protocol adapter for transferring both J1708 and J1939 protocol diagnostic messages between networks within a vehicle and a host computer is merely exemplary in nature, and is in no way intended to limit the invention or its applications or uses.

Figure 1:
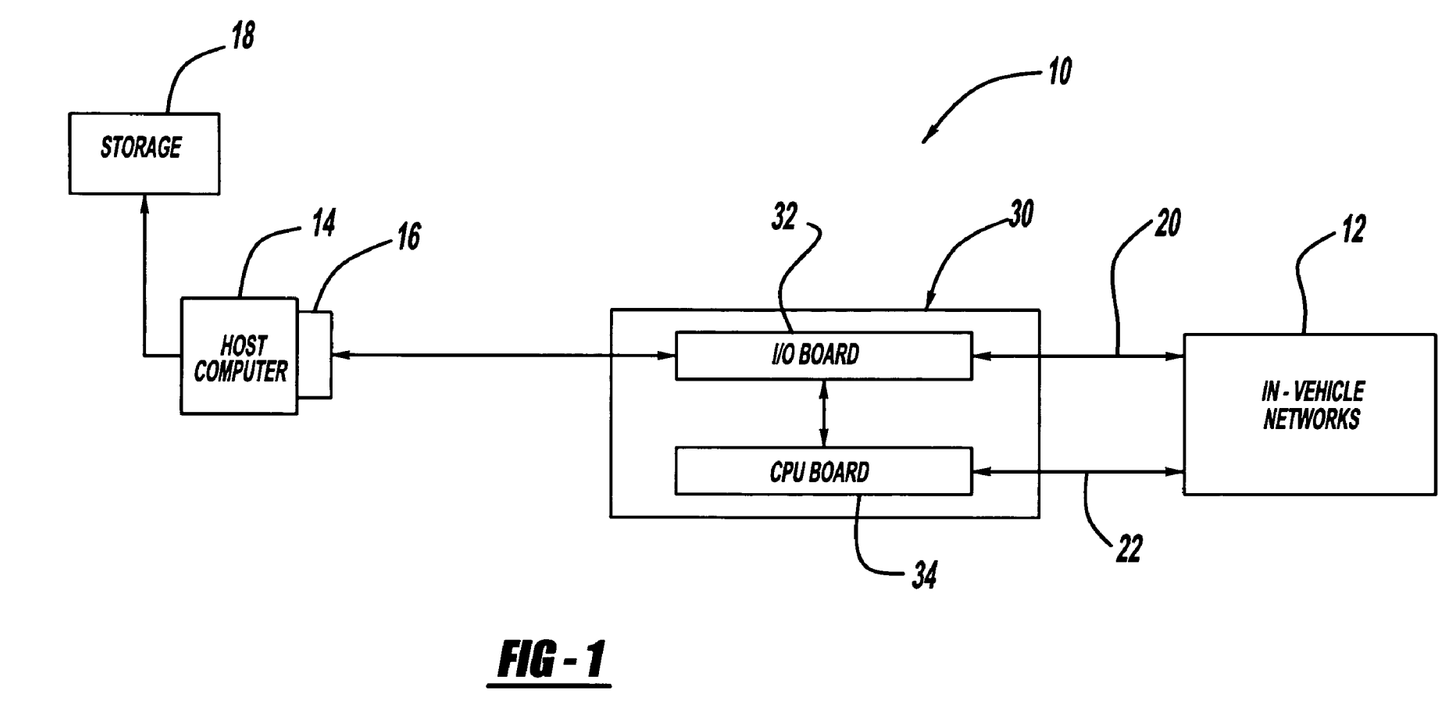
FIG. 1 is a block diagram of a protocol adaptersystem, according to an embodiment of the present invention, that transfers both J1708 and J1939 signals between a host computer and a vehicle network.

FIG. 1 is a block diagram of a system 10 for transferring diagnostic signals between vehicle networks 12 in a vehicle to an external host computer 14 through a protocol adapter 30. Such diagnostic messages can be any signals for monitoring any suitable vehicle network within the vehicle for diagnostics and/or maintenance purposes, as would be well understood to those skilled in the art. The host computer 14 can be any host computer known in the art used for this purpose, including state of the art host computers and obsolete host computers. The host computer 14 includes an RS-232 I/O port 16 that provides an RS-232 interface to the host computer 14. The RS-232 port 16 provides direct access to the J1708/RS-485 link. The signals received and analyzed by the host computer 14 can be stored in any suitable storage device 18, such as a display or magnetic tape. The signals used by the vehicle networks 12 can be of any particular vehicle protocol, including the J1708 protocol provided on line 20 and the J1939 protocol provide on line 22.

According to the invention, the protocol adapter 30 is compatible for both the J1708 protocol and the J1939 protocol. The protocol adapter 30 provides a "pass-through" interface so that various compliant applications from various developers can use any of the unique developer applications. This allows all compliant software applications and hardware interface adapters to be interchangeable. The protocol adapter 30 is capable of performing electronic control module (ECM) emulation, analysis of network message loading, simulation of message traffic loading of an in-vehicle network, inventory management, ECM code testing, a gateway between networks and vehicle maintenance status checks.

The protocol adapter 30 includes an I/O sub-assembly board 32 and a CPU sub-assembly board 34, both of which will be described in detail below. When the vehicle networks 12 use the J1708 protocol, the protocol adapter 30 can operate in a pass-through mode where the J1708 signals on the line 20 are passed through a voltage translator directly to an RS-232 transceiver in the I/O board 32. With the J1708 protocol, the protocol adapter 30 can also operate under the control of an embedded processor where the J1708 signals on the line 20 are passed through a voltage translator to be processed in the CPU board 34 and routed to an RS-232 transceiver (discussed below) in the I/O board 32. If the vehicle networks 12 are using the newer J1939 protocol, the J1939 signals on the line 22 are processed in the CPU board 34 to provide the J1939 compatibility.

Figure 2:
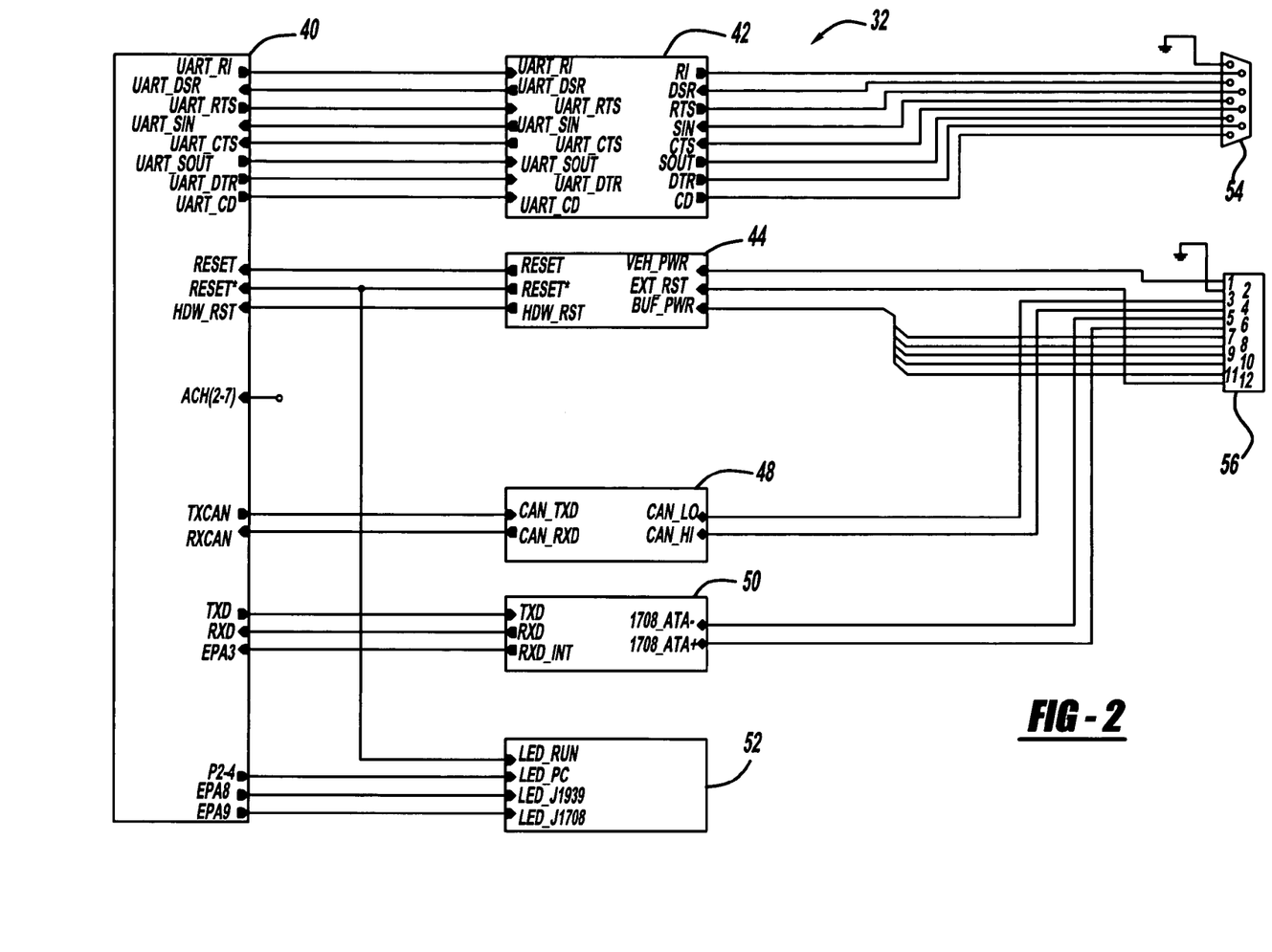
FIG. 2 is a schematic block diagram of an input/output (I/O) board in the protocol adapter shown in FIG. 1.

The I/O board 30 and the CPU board 34 use the following list of signals:

ACH[2.7]-inputs for the analog/digital converter
RESET*-active low signal issued to reset the processor
READY-signal used to lengthen memory cycles for slow memory
RD*-active low signal used for external memory reads
WRH*-active low signal used to designate high-byte writes
WR*-active low signal used for external writes
EXTINT-designates an external interrupt
AD[0.15]-address data lines to transfer between the processor and memory
LA[0.15]-latch address used to latch the desired memory bytes
EPA3-input/output for high speed capture/compare channels
EPA8-input/output for high speed capture/compare channels
EPA9-input/output for high speed capture/compare channels
SC0-clock pin for SSIO0
SD0-data pin for SSIO0
SC1-clock pin for SSIO0
SD1-data pin for SSIO0
P2.4-standard bi-directional ports for data transfer
TXD-used to transmit serial data
RXD-used to receive serial data
TXCAN-used to transmit CAN signal
RXCAN-used to receive CAN signal
A[9.15]-high level address for selecting large byte operations
HDW_RST*-active love hardware reset
FLASH_UPPER-FLASH upper byte
FLASH_CS*-active low enable FLASH chip select
RAM_CS*-active low enable RAM chip select
UART_CS*-active low enable UART chip select
D[0.15]-data signal used to transfer data bi-directionally between the processor and memory
A[1.15]-address signal used to select the desired memory allocation area
CE*_LOWER-active low chip enable for lower byte
DE*_LOWER-active low data enable for lower byte
WE*_LOWER-active low write enable for lower byte
CE*_UPPER-active low chip enable for upper byte
DE*_UPPER-active low data enable for upper byte
WE*_UPPER-active low write enable for upper byte
FLASH_UPPER-FLASH upper byte write enable
FLASH_CE*-active low FLASH chip enable
FLASH_DE*-active low FLASH data enable
FLASH_WE*-active low FLASH write enable
A[1.3]-address signal used to select the desired allocation area
D[0.7]-data signal used to transfer data bi-directionally between the processor and memory
CS*-active low chip select
RESET-signal used for reset
INTR-interrupt line to processor
SOUT-data out
DTR*-active low enable data terminal ready
RTS*-active low enable ready to send
MBAUD-used to set the processor in high speed mode. Unused in this application.
SIN-data in
DSR*-active low enable data set ready
CTS*-active low enable clear to send
EPA3-input/output for high speed for capture/compare channels
EPA8-input/output for high speed for capture/compare channels
EPA9-input/output for high speed for capture/compare channels
P2.4-PC LED control
UART_SOUT-UART data out
UART_DTR*-active low enable UART data terminal ready
UART_RTS*-active low enable UART ready to send
UART_SIN-UART data in
UART_DSR*-active low enable UART data set ready
UART_CTS*-active low enable UART clear to send FIG. 2 is a schematic block diagram of the I/O board 32. The (I/O) board 32 includes an external I/O interface circuit 40, an RS-232 transceiver circuit 42, a power supply regulator circuit 44, a controller area network (CAN) transceiver circuit 48 for the J1939 protocol, a J1708 transceiver circuit 50 including a voltage translator, an LED indicator circuit 52 and input and output ports 54 and 56 interconnected as shown. The external I/O interface circuit 40 provides the interface connection between the various circuits in the I/O board 32 and the connections to the host computer 14 and the vehicle networks 12. The RS-232 transceiver circuit 42 provides an RS-232 interface between the vehicle networks 12 and the host computer 14.

Figure 3:
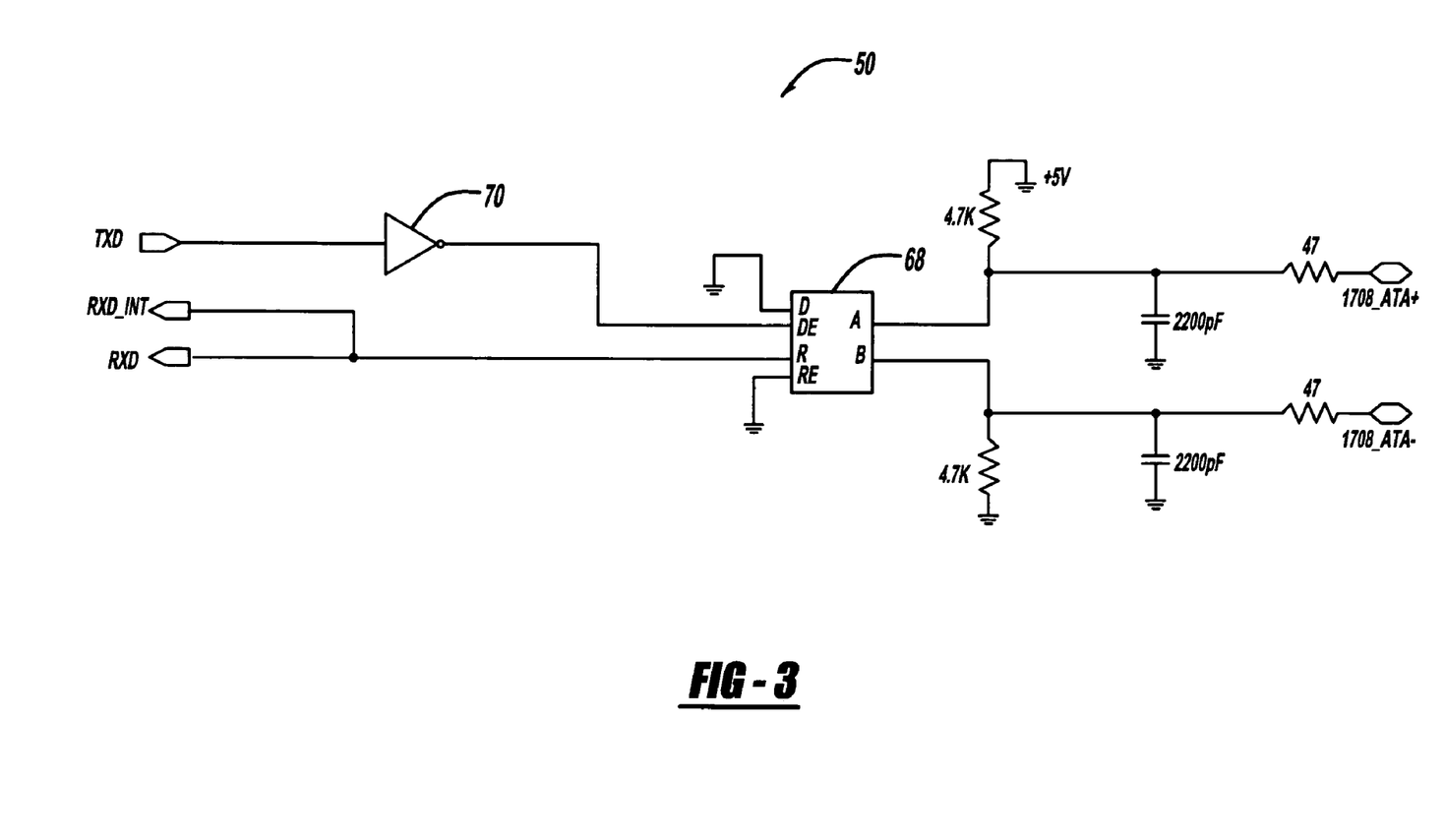
FIG. 3 is a schematic diagram of a J1708 transceiver circuit in the I/O board shown in FIG. 2.

The CAN transceiver circuit 48 provides a CAN interface between the vehicle networks 12 and the host computer 14 when the vehicle networks 12 are operating in the J1939 protocol. In one embodiment, the CAN transceiver is the model P82C251T, well known to those skilled in the art. The J1708 transceiver circuit 50 provides the J1708 protocol interface between the vehicle networks 12 and the host computer 14. FIG. 3 is a schematic diagram of the J1708 transceiver circuit 50 and includes a voltage translator 68 and an input buffer 70 electrically interconnected, as shown. In one embodiment, the voltage translator 68 is the model SN75176, well known to those skilled in the art.

Both the transceiver circuits 48 and 50 include transmit mailboxes for transmitting J1708 and J1939 messages to the networks 12 and receive mailboxes for receiving J1708 and J1939 messages from the networks 12. The protocol adapter 30 allows the user to customize each transmitted message. The J1708 or J1939 message to be transmitted may include the relative time to the adapter timer, when the message transmission is to begin, the number of times the message is to be sent, the desired time interval between transmissions, the ID and data to be sent, the conditions for a call back announcing a successful transmission, the number of times the message should be sent before auto-deletion occurs, and whether to enable a call back announcing the time of message deletion. The J1708 or J1939 message received may include which protocol to scan, which bits should be masked by hardware-level filtering, which bits should be matched by hardware-level filtering, what information, such as mailbox number, time stamp, identifier, length of data, etc., should be sent to the host immediately upon receipt, and how the application will be notified when a message is received, such as transparent update, receive call back, polling, etc.

Figure 4:
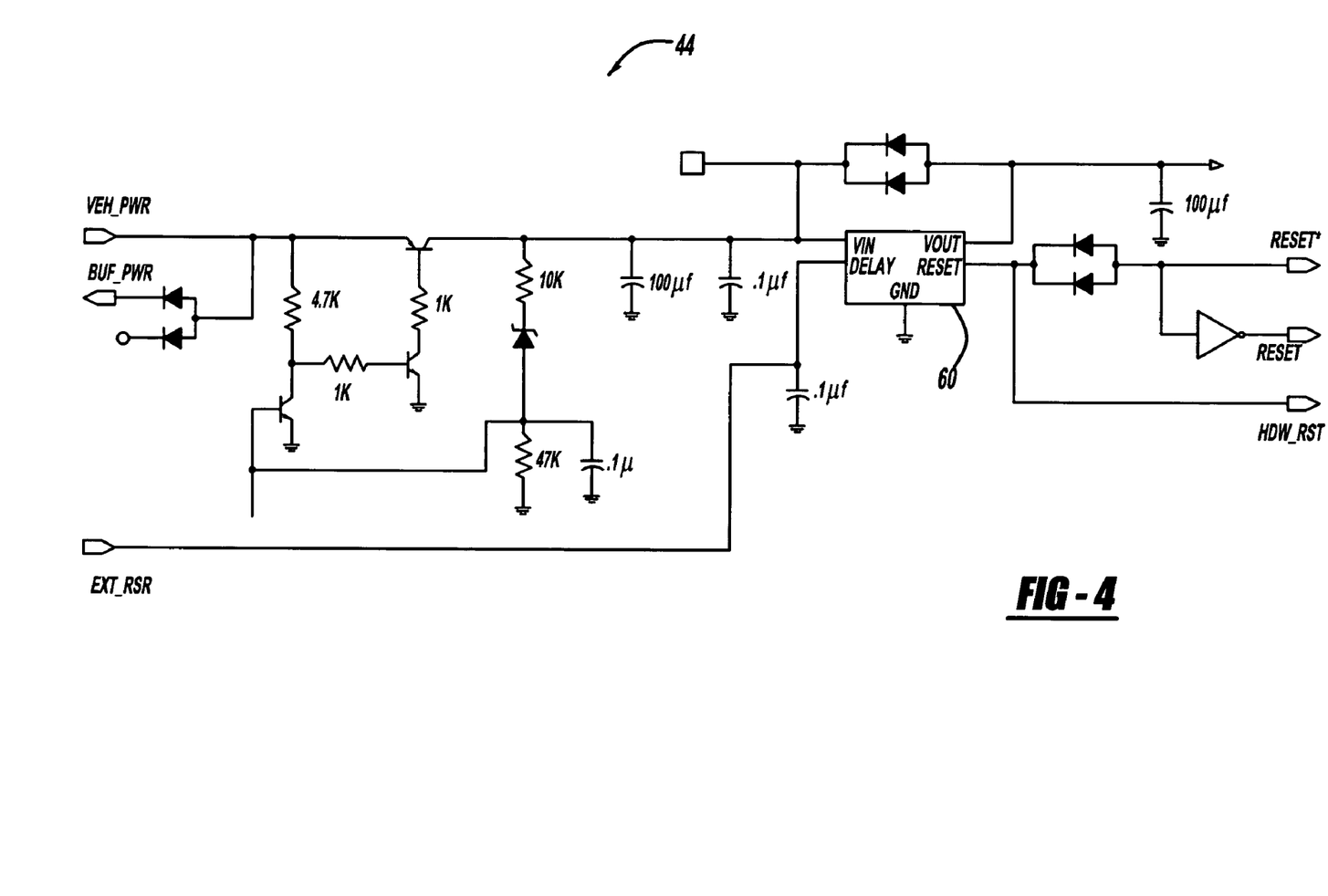
FIG. 4 is a schematic diagram of a power supply regulator circuit in the I/O board shown in FIG. 2.

FIG. 4 is a schematic diagram of the power supply regulator circuit 44 and includes a voltage regulator 60 interconnected with other circuit elements, as shown. The power supply regulator circuit 44 converts a vehicle battery voltage to a regulated 5V DC for operation of the adapter 30.

Figure 5:
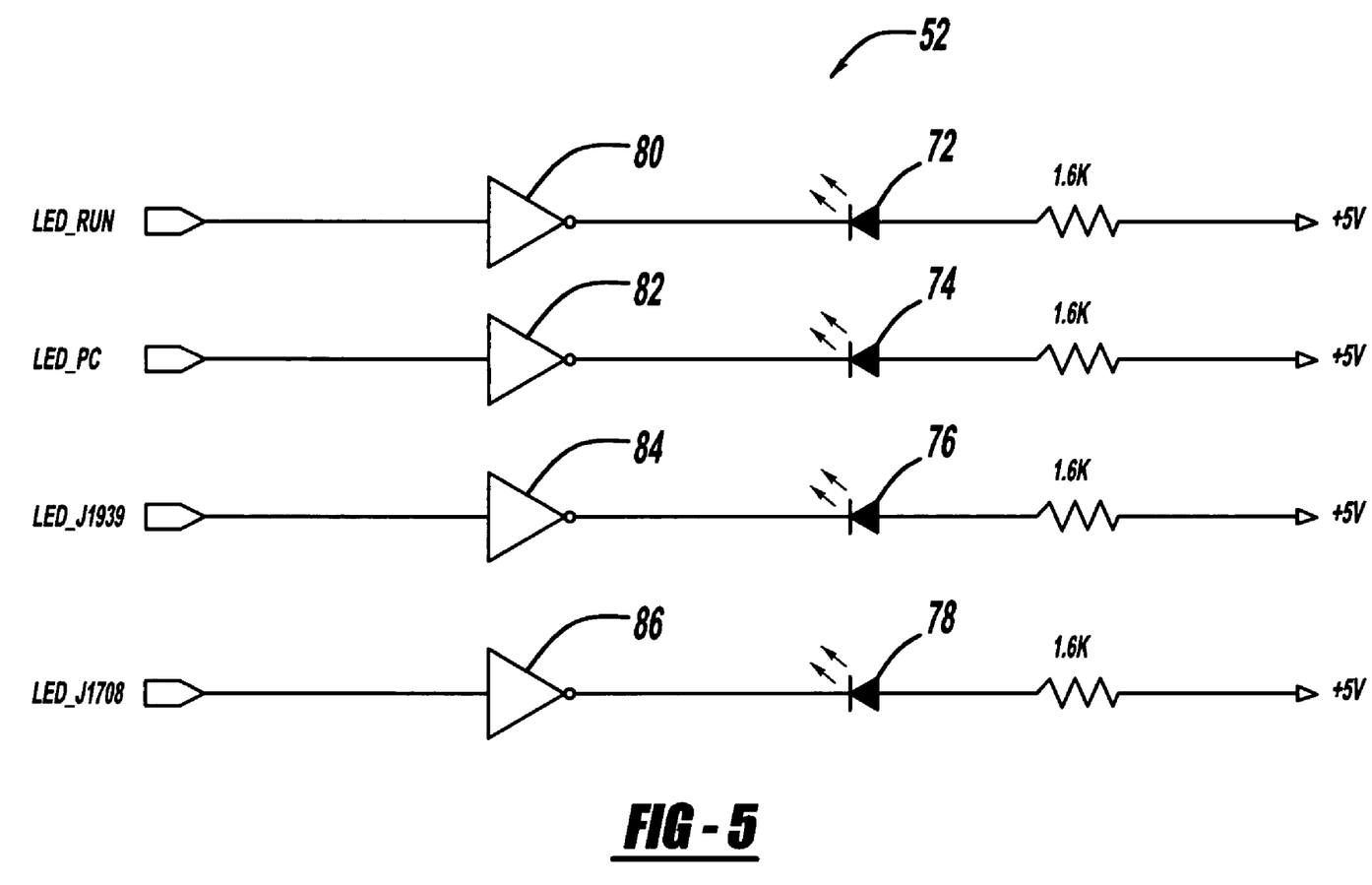
FIG. 5 is a schematic diagram of an LED indicator circuit in the I/O board shown in FIG. 2.

FIG. 5 is a schematic diagram of the LED circuit 52. The LED circuit 52 includes four LED control lines coupled to four LEDs 72, 74, 76 and 78 through input buffers 80, 82, 84 and 86, respectively. In this embodiment, the LED 72 indicates that the protocol adapter 30 is being powered, the LED 74 indicates a link to the RS-232 port 16 of the host computer 14, the LED 76 indicates that the protocol adapter 30 is operating in the J1939 protocol and the LED 78 indicates that the protocol adapter 30 is operating in the J1708 protocol.

Figure 6:
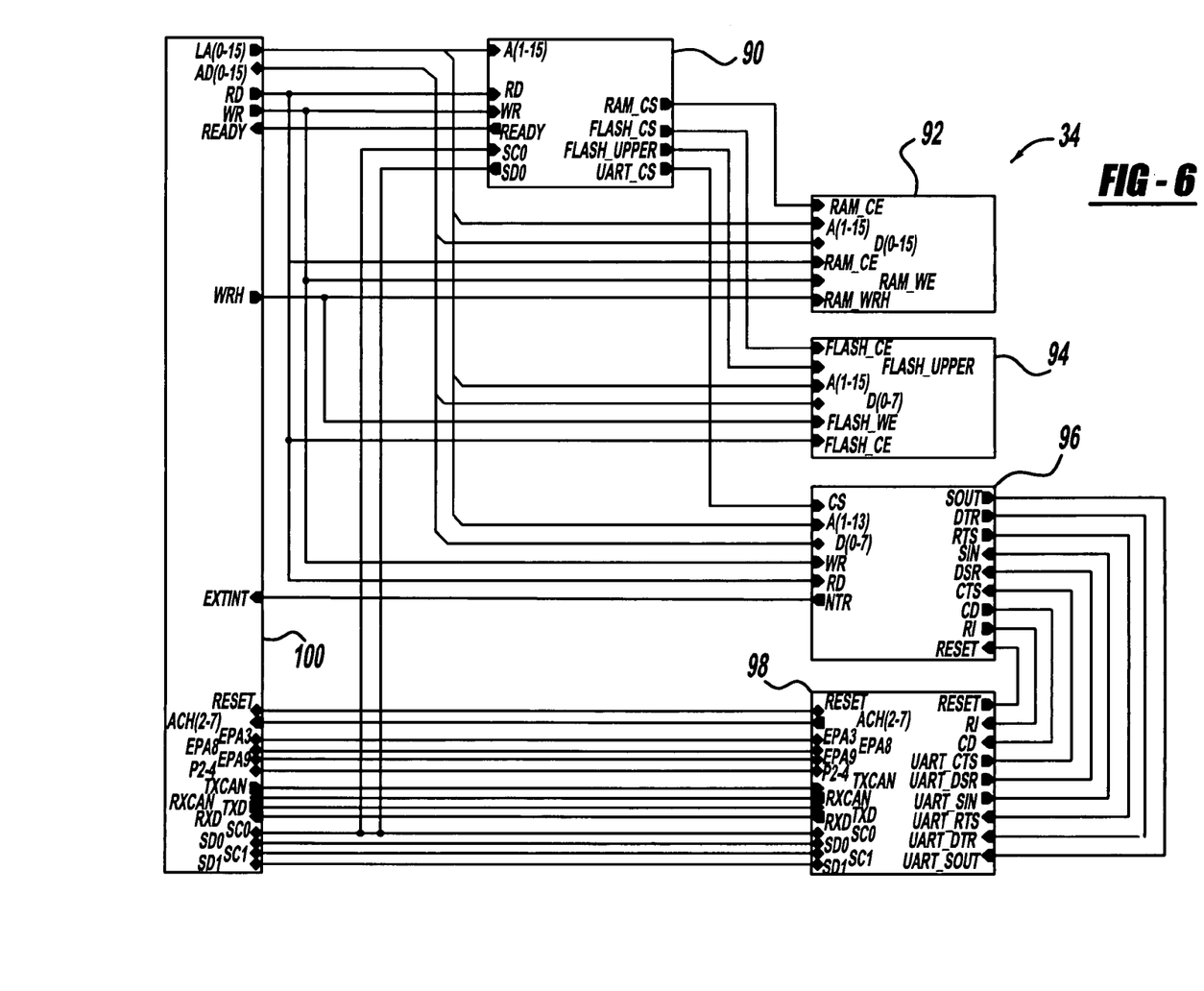
FIG. 6 is a schematic block diagram of a central processing unit (CPU) board in the protocol adapter shown in FIG. 1.

FIG. 6 is a schematic block diagram of the CPU board 34. The CPU board 34 includes a CPU 100, a device decoder circuit 90, a static RAM circuit 92, a flash memory module 94, a UART circuit 96 and a CPU I/O interface circuit 98 electrically interconnected as shown. The flash memory module 94 is used for program storage. The module 94 is responsible for the permanent storage of the application data and loader application information. The module 94 allows the protocol adapter 30 to be updated with new firmware in the field. The uploaded firmware is stored in the RAM circuit 92.

The UART circuit 96 is used for communication of asynchronous data to and from the programmable controller 14. The UART circuit 96 is used to convert parallel data from the CPU 100 to serial data to the host computer 14, and vice versa.

Figure 7:
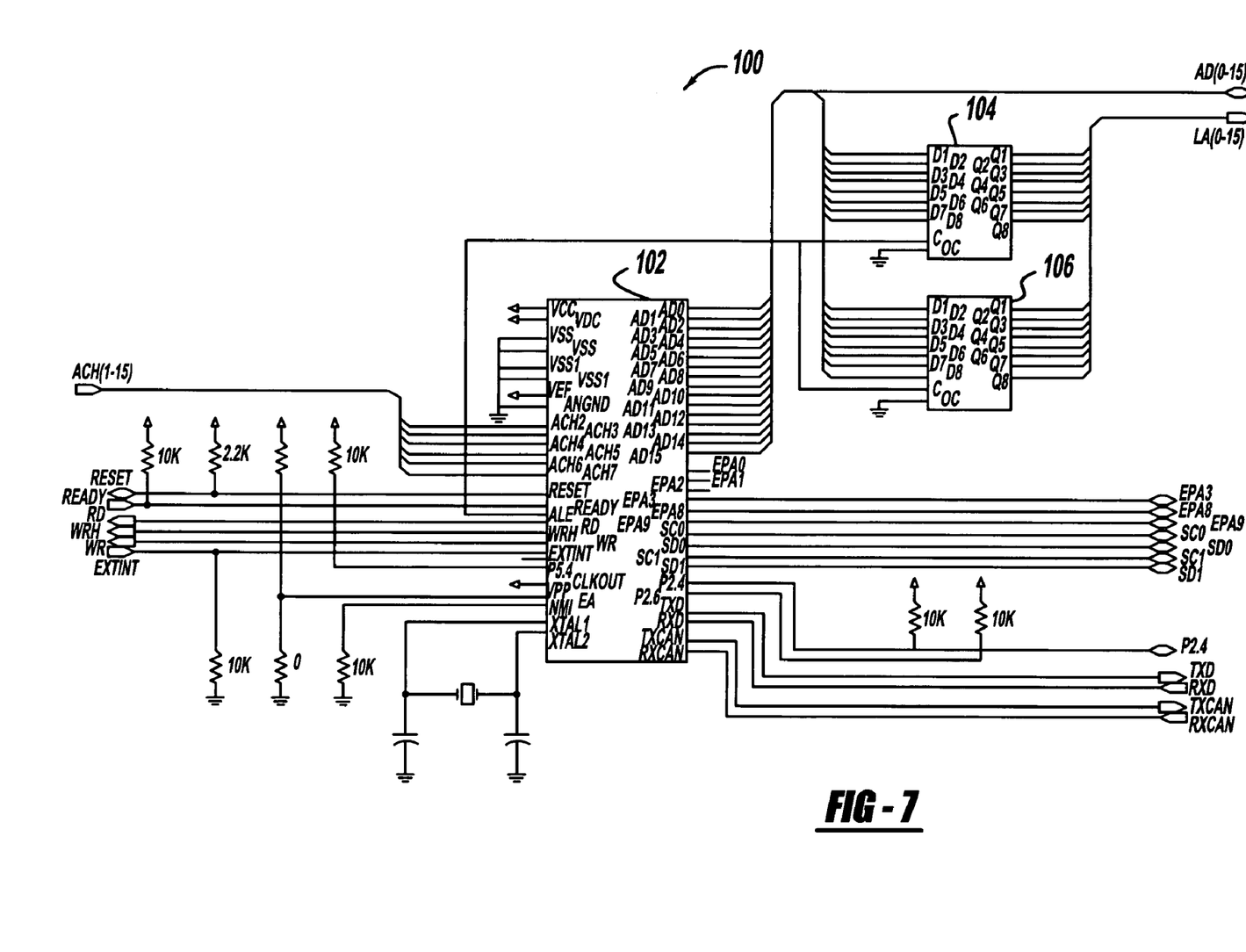
FIG. 7 is a schematic diagram of the central processing unit in the CPU board shown in FIG. 6.

FIG. 7 is a schematic diagram of the CPU 100, and includes a microprocessor 102 and two input/output chips 104 and 106 electrically coupled as shown. In this embodiment, the microprocessor 102 is the model 87C196CA and the chips 104 and 106 are the model 74HC573. In the pass through mode, the microprocessor 102 delivers data directly to the J1708 transceiver circuit 50 to the RS-232 transceiver circuit 42, and monitors the data so as to provide the J1708 defined timing signals on any or all of the RS-232 hardware handshake signals.

Figure 8:
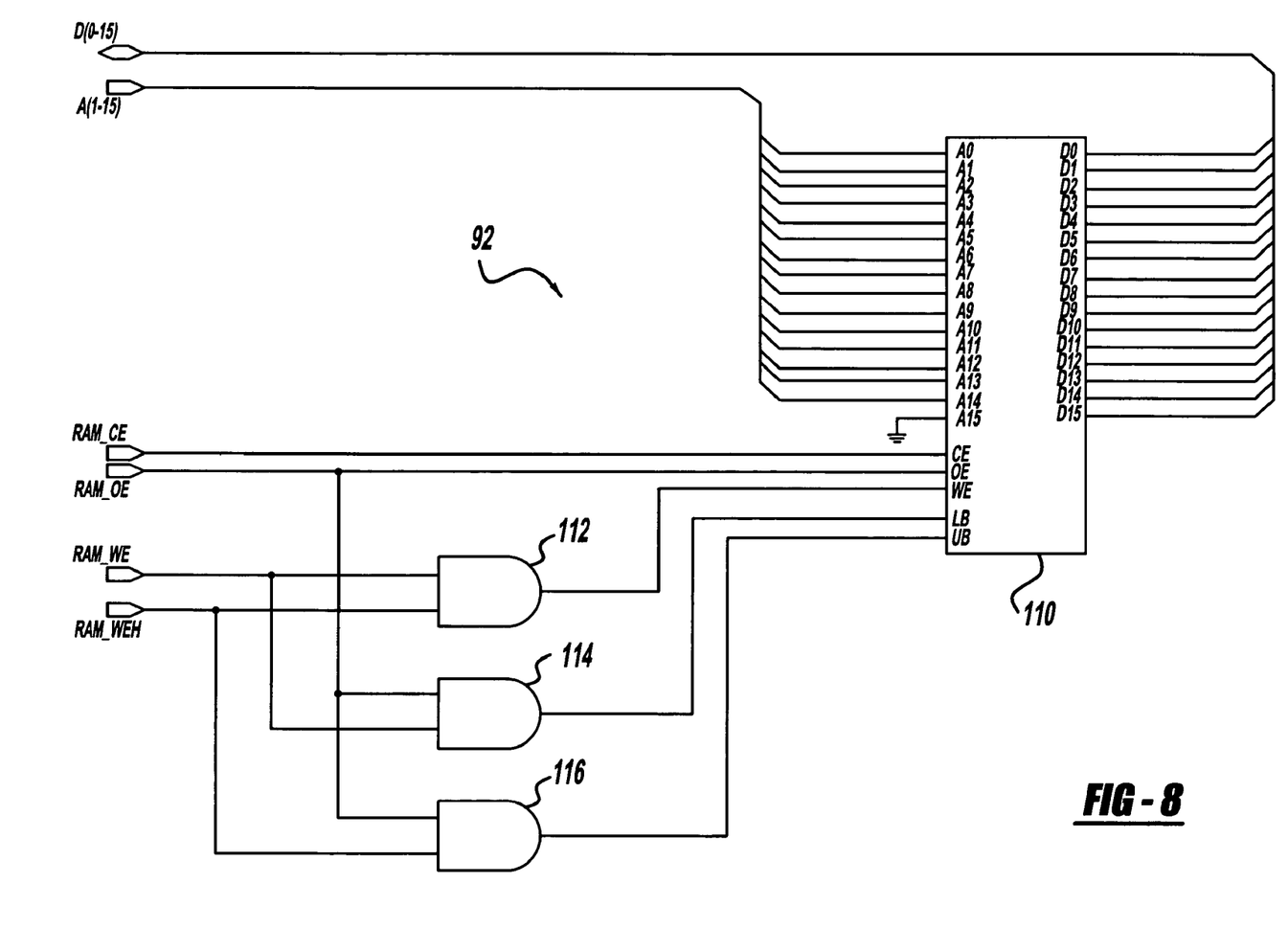
FIG. 8 is a schematic diagram of a static memory module circuit in the CPU board shown in FIG. 6.

FIG. 8 is a schematic diagram of the static RAM circuit 92, and includes a memory chip 110 and AND gates 112, 114 and 116 electrically interconnected as shown. In one embodiment, the memory chip 110 is the model TC551664BJ-20, well known to those skilled in the art. The memory chip 110 is used for temporary data storage and is connected to the CPU 100 through the data and address channels. Once a memory allocation area is specified through the address channel, data can be read or written through the data channel. Data signals D(0-15) are used to transfer data bi-directionally between the CPU 100 and the memory chip 110. Address signals A(1-15) are used to select the desired memory allocation area in the memory chip 110.

The static RAM circuit 92 provides space reserved in the adapter's memory for the temporary storage of data for the transmit and receive mailboxes. The static RAM circuit 92 provides flexibility for transmitting and receiving messages, regardless of the J1708 or J1939 vehicle protocol, by providing a temporary message storage location, redirection of mailbox data, storage for oversized messages, such as J1939 transport protocol messages, and the concatenation of small messages.

Sometimes both the J1708 and the J1939 protocols transmit oversized messages. A normal J1708 message may be up to 21 bytes long. However, special modes may utilize longer messages. The protocol adapter 30 accommodates these oversized messages by putting the J1708 mailbox into extended mode and attaching it to a location in the static RAM circuit 92. The J1939 transport layer also makes use of the RAM circuit 92 to ensure that transport timing requirements are met. The storing of multiple messages in the static RAM circuit 92 reduces multiple reads and writes to the adapter hardware. The concatenation of these short messages reduces the overhead on the serial port. The static RAM circuit 92 allows users to replace legacy hardware with an interface that can support existing software. Consequently, users can replace legacy hardware with the protocol adapter 30 and maintain compatibility with their original software.

Figure 9:
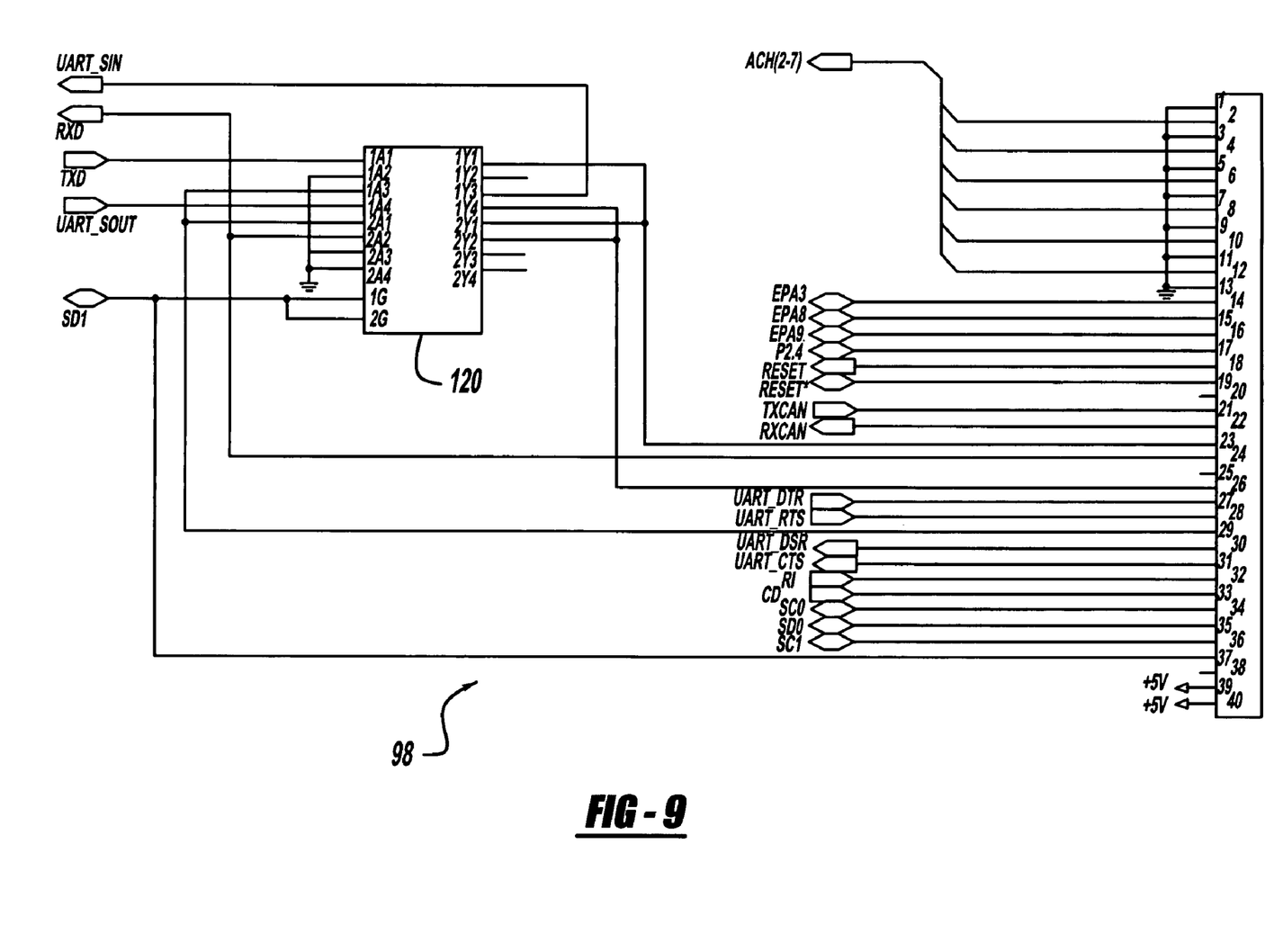
FIG. 9 is a schematic diagram of an I/O interface connector circuit in the CPU board shown in FIG. 6.

FIG. 9 is a schematic diagram of the CPU I/O interface circuit 98, and includes an interface chip 120. In one embodiment, the interface chip 120 is the model 74HC241. The interface circuit 98 provides interfacing between the CPU 100 and the I/O board 32.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A protocol adapter for transferring diagnostic messages between a vehicle network in a vehicle and an external host computer, said adapter comprising:

a control area network (CAN) transceiver circuit, said CAN transceiver circuit providing an interface between the vehicle network and the host computer when the vehicle network is operating in a J1939 protocol;

a J1708 transceiver circuit, said J1708 transceiver circuit providing an interface between the vehicle network and the host computer when the vehicle network is operating in a J1708 protocol, said J1708 transceiver circuit including a voltage translator for translating the voltage of the J1708 protocol signals; and a central processing unit (CPU), said CPU controlling the operation of the CAN transceiver circuit and the J1708 transceiver circuit to switch between the CAN transceiver circuit and the J1708 transceiver circuit depending on whether the host computer is operating in the J1939 protocol or the J1708 protocol or both.

2. The protocol adapter according to claim 1 further comprising an RS-232 transceiver, said RS-232 transceiver circuit providing an interface to an RS-232 port on the host computer.

3. The protocol adapter according to claim 1 further comprising a device decoder, said device decoder decoding input signals sent to the CPU.

4. The protocol adapter according to claim 1 further comprising a static random access memory (RAM) circuit, said RAM circuit including a RAM that provides temporary data storage and is connected to the CPU through data and address channels.

5. The protocol adapter according to claim 4 wherein the RAM circuit further provides redirection of mailbox data, storage for oversized messages and the concatenation of small messages.

6. The protocol adapter according to claim 1 further comprising a flash memory module, said flash memory module providing permanent storage of application data and loader application information.

7. The protocol adapter according to claim 1 further comprising a universal asynchronous receive and transmit (UART) circuit, said UART circuit providing communication of asynchronous data to and from the host computer.

8. The protocol adapter according to claim 1 further comprising a CPU I/O interface circuit, said CPU I/O interface circuit providing an interface between the CPU and the transceiver circuits.

* * * * *